(12) United States Patent
Blossom et al.

(10) Patent No.: US 6,996,408 B2
(45) Date of Patent: Feb. 7, 2006

(54) MOBILE MESSAGING GLOBAL DIRECTORY

(75) Inventors: Kent Blossom, Wilmington, NC (US); David Baxley, Columbia, SC (US); Krishnendu Kundu, Arlington, VA (US); Paul E. Leuba, Hunt Valley, MD (US); Tapas K. Som, Germantown, MD (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 10/037,425

(22) Filed: Jan. 3, 2002

(65) Prior Publication Data

US 2003/0125022 A1 Jul. 3, 2003

(51) Int. Cl.
*H04Q 7/20* (2006.01)
*H04M 11/04* (2006.01)
*H04M 3/42* (2006.01)

(52) U.S. Cl. .......... 455/466; 455/404.1; 455/414.4; 455/417; 455/426.1; 455/456.1; 455/456.3; 379/45

(58) Field of Classification Search .......... 455/404.2, 455/412.1, 412.2, 419, 426.1, 445, 456.1, 455/456.2, 456.3, 456.5, 456.6, 466, 517, 455/518, 519, 520, 413, 434, 414.1, 414.3–414.4, 455/567, 417–418, 422.1, 424–425, 426.2, 455/432.1, 435.1–435.3, 432.2, 521, 550.1, 455/553.1, 560–561; 379/37–51, 88.13–88.14; 709/218, 219; 370/396, 395.3–395.5, 395.54
See application file for complete search history.

(56) References Cited

U.S. PATENT DOCUMENTS

| | | | |
|---|---|---|---|
| 4,817,190 A | 3/1989 | Comroe et al. | |
| 5,377,323 A | 12/1994 | Vasudevan | |
| 5,420,916 A * | 5/1995 | Sekiguchi | 379/230 |
| 5,659,596 A * | 8/1997 | Dunn | 455/456.1 |
| 5,719,562 A | 2/1998 | Fawcett | |
| 5,732,074 A | 3/1998 | Spaur et al. | |
| 5,758,291 A * | 5/1998 | Grube et al. | 455/518 |
| 5,759,078 A * | 6/1998 | Levine et al. | 445/24 |
| 5,872,779 A * | 2/1999 | Vaudreuil | 370/352 |

(Continued)

FOREIGN PATENT DOCUMENTS

EP    0 447 038 A2 *  9/1991

(Continued)

*Primary Examiner*—William Trost
*Assistant Examiner*—Meless Zewdu
(74) *Attorney, Agent, or Firm*—Gibb I.P. Law Firm, LLC; Jay H. Anderson, Esq.

(57) ABSTRACT

A method and structure for a communication system has a first-level regional server connected to a first agency and a second agency, and a second-level regional server connected to a plurality of the first-level regional servers. The second-level regional server has a first connection for connecting to one first-level regional server. The invention also has a second connection for connecting to another first-level regional server. The invention also includes a global directory and a central processing unit.

21 Claims, 5 Drawing Sheets

U.S. PATENT DOCUMENTS

| | | | |
|---|---|---|---|
| 5,894,478 A * | 4/1999 | Barzegar et al. | 370/401 |
| 5,905,777 A * | 5/1999 | Foladare et al. | 379/90.01 |
| 5,987,506 A * | 11/1999 | Carter et al. | 709/213 |
| 6,009,330 A | 12/1999 | Kennedy, III et al. | |
| 6,014,711 A * | 1/2000 | Brown | 709/245 |
| 6,073,141 A * | 6/2000 | Salazar | 707/204 |
| 6,122,258 A | 9/2000 | Brown | |
| 6,131,095 A | 10/2000 | Low et al. | |
| 6,199,068 B1 | 3/2001 | Carpenter | |
| 6,204,844 B1 | 3/2001 | Fumarolo et al. | |
| 6,246,758 B1 | 6/2001 | Low et al. | |
| 6,247,012 B1 * | 6/2001 | Kitamura et al. | 707/10 |
| 6,603,764 B1 * | 8/2003 | Epley | 370/395.1 |
| 6,603,837 B1 * | 8/2003 | Kesanupalli et al. | 379/88.17 |
| 6,751,210 B1 * | 6/2004 | Shaffer et al. | 370/352 |

FOREIGN PATENT DOCUMENTS

| | | | |
|---|---|---|---|
| WO | WO 99/21380 | * | 4/1999 |

* cited by examiner

MOBILE MESSAGING GLOBAL DIRECTORY

GOVERNMENT RIGHTS

This invention was made with Government support under Contract Number 2001RBCXK001 awarded by the National Institute of Justice. The Government has certain rights in this invention.

BACKGROUND OF THE INVENTION

1. Field of the Invention

The present invention generally relates to communication systems and more particularly to a regional message server that provides the ability to establish interoperability between many incompatible data communication systems.

2. Description of the Related Art

Regional public safety and transportation organizations utilize incompatible infrastructures that do not support communications between the various agencies. In order to support seamless communications between multiple jurisdictions, a system is needed that allows users in one agency to specifically address users in other agencies. This objective must be accomplished with minimal impact to users of existing mobile data systems, yet it must offer an environment that is easily scalable as new agencies decide to participate.

However, existing communication systems present significant hurdles to accomplishing such goals. For example, as shown in FIGS. 1A and 1B, two communication units 120, 121 within a given agency (e.g., Agency A) presently have an existing mobile data system (message switch 122, CAD host 123) in place. These systems were designed to allow officers within each respective agency to send and receive messages among local agency units 120, 121 and the local host (CAD) 123 system. Agency B similarly includes mobile units 125, 126, message switch 127, and host 128. There is no conventional addressing provision in place to allow an Agency A unit (FIG. 1A) to send messages to an Agency B unit (FIG. 1B).

Each agency also chooses the method by which they want to address their units. Agency address plans typically reflect their method of operation. Some agencies use officer badge numbers, some use unit numbers assigned to vehicles, some may use beat plan representations, and others may simply choose arbitrary numbers.

The problem is that each particular agency has its own schema and formats for addressing mobile and stationary systems. When each agency exists on its own, with no inter-agency integration requirement, it really does not matter how they choose to address their units. It is also quite likely that some agencies would, in fact, choose similar schemes so that one agency may have addresses that are duplicated in another agency. This is a problem that must be solved if inter-agency communication is to be achieved. The present invention solves this problem, as shown below.

SUMMARY OF THE INVENTION

In view of the foregoing and other problems, disadvantages, and drawbacks of the conventional communication systems, the present invention has been devised, and it is an object of the present invention, to provide a structure and method for an improved inter-agency communication system.

In order to attain the object(s) suggested above, there is provided, according to one aspect of the invention, a communication system that has a first-level regional server connected to two or more agency data communication systems. The first-level regional server includes a translator, wherein the attached agencies operate under different addressing protocols and the translator translates between them.

As the regional server assigns addresses in accordance with a global addressing schema, the invention also provides for the connection of two or more regional servers in a multi-regional data communications system, and the connection of two or more multi-regional systems into a national or multi-national data communications system.

In the regional data communication environment, the first agency and the second agency are provided access to the global directory to obtain addresses of units within the global directory. The first-level regional server has a first connection for connecting to the first agency. The invention also has a second connection for connecting to the second agency, a global directory, and a central processing unit.

The first-level regional servers include a translator, wherein the first agency and the second agency operate under different addressing protocols and the translator translates between the different protocols. The global directory maintains addresses of units within the first agency and the second agency. The central processing unit changes an address of a message received from the first agency into a format acceptable to the second agency, and forwards the message to the second agency.

The invention also includes a method of transferring messages between a first agency and a second agency. The invention utilizes the existing data communication system in the first agency, wherein a message is sent from a sending unit in the first agency to a first message switching unit within the first agency. Next, the invention transfers the message from the first message switching unit to a first regional message server. The invention then transfers the message from the first regional message server to an existing data communication system within the second agency. The invention alters the address of the message by using the regional message server. The invention transfers the message from the regional message server to a second message switching unit in the second agency, which then transfers the message from the second message switching unit to a destination unit in the second agency.

The invention translates the message from an addressing protocol used by the first agency to a protocol used by the second agency. The invention maintains a global directory of addresses of units within the first agency and the second agency. The invention provides the first agency and the second agency access to the global directory to obtain addresses of units within the global directory. The invention also produces a report of active units in the first agency and the second agency.

The invention allows users in one agency to specifically address users in other agencies with minimal impact to users of existing mobile data systems. The invention offers an environment that is easily scalable as new agencies decide to participate. The invention is based upon a regional message server using a global directory. In addition to supporting regional users, the inventive addressing plan used to support the global directory also supports expansion into other regions, states, and even nations. In addition to the benefit of providing basic messaging capabilities (e.g., unit-to-unit, unit-to-host, host-to-unit, etc.), the invention enables efficient implementation of several more advanced functions (e.g., dynamic group addressing). The invention can also be used to solve problems in integrating dissimilar legacy systems in applications other than in public sector/public safety.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

As discussed above, in order to support seamless communications between multiple jurisdictions, a system must allow users in one agency to specifically address users in other agencies. This objective must be accomplished with minimal impact to users of existing mobile data systems, yet it must offer an environment that is easily scalable as new agencies decide to participate. The invention develops such a method based upon the concept of a "global directory." In addition to supporting regional users, the inventive addressing plan used to support the global directory also supports expansion into other regions, states, and even nations.

In addition to the benefit of providing basic messaging capabilities (e.g., unit-to-unit, unit-to-host, host-to-unit, etc.) with minimal impact to users of existing mobile data systems, the invention enables efficient implementation of several more advanced functions (e.g., dynamic group addressing and determining active units). The invention can also be used to solve problems in integrating dissimilar legacy systems in applications other than in public sector/public safety.

As mentioned, the invention enables dynamic group addressing for various applications. For example, a supervisor may place users into a group based upon particular task assignments, and later address messages to the entire group by using a single group address. Users may also be grouped simply as participants in a particular regional data communications system, again enabling a message to be sent to all users in the region by using a single group address. Also, because the invention provides for a log of active regional system users, the invention enables the determination of active users. For example, a unit responding to an emergency call could query the regional system to determine what units from other participating agencies are active and, thus, potentially available to assist in the emergency response.

Figure 1B:
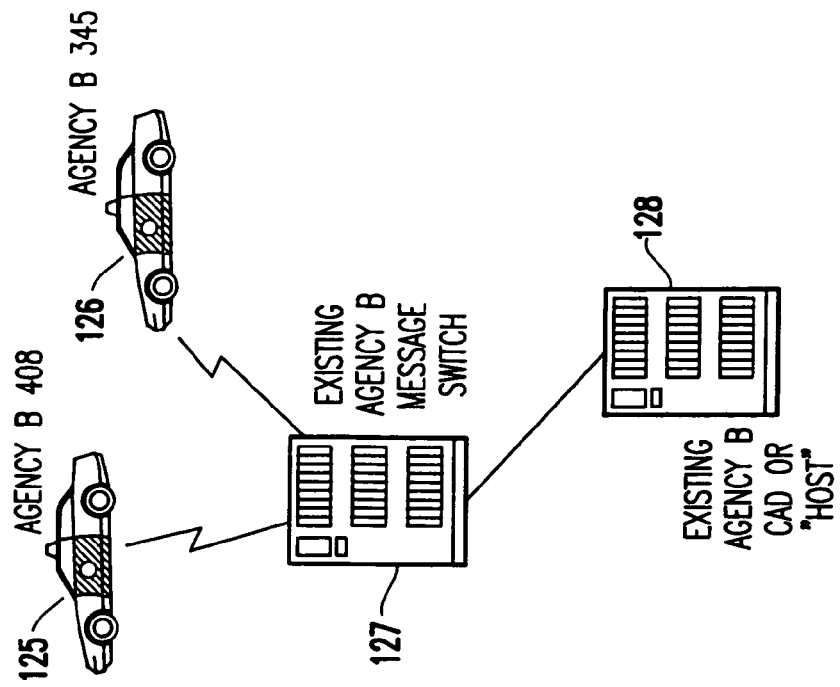
FIGS. 1A and 1B are schematic diagrams of conventional mobile communication systems.
Figure 1A:
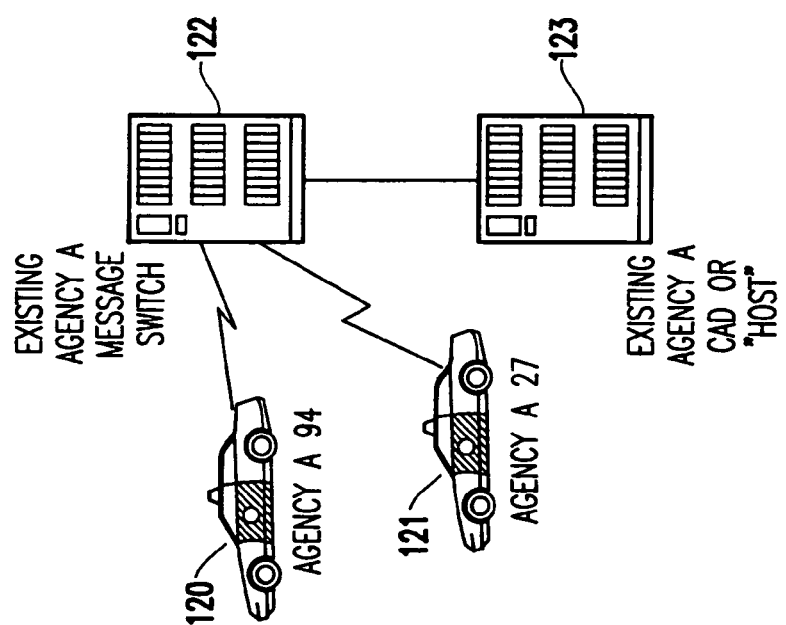
Figure 2:
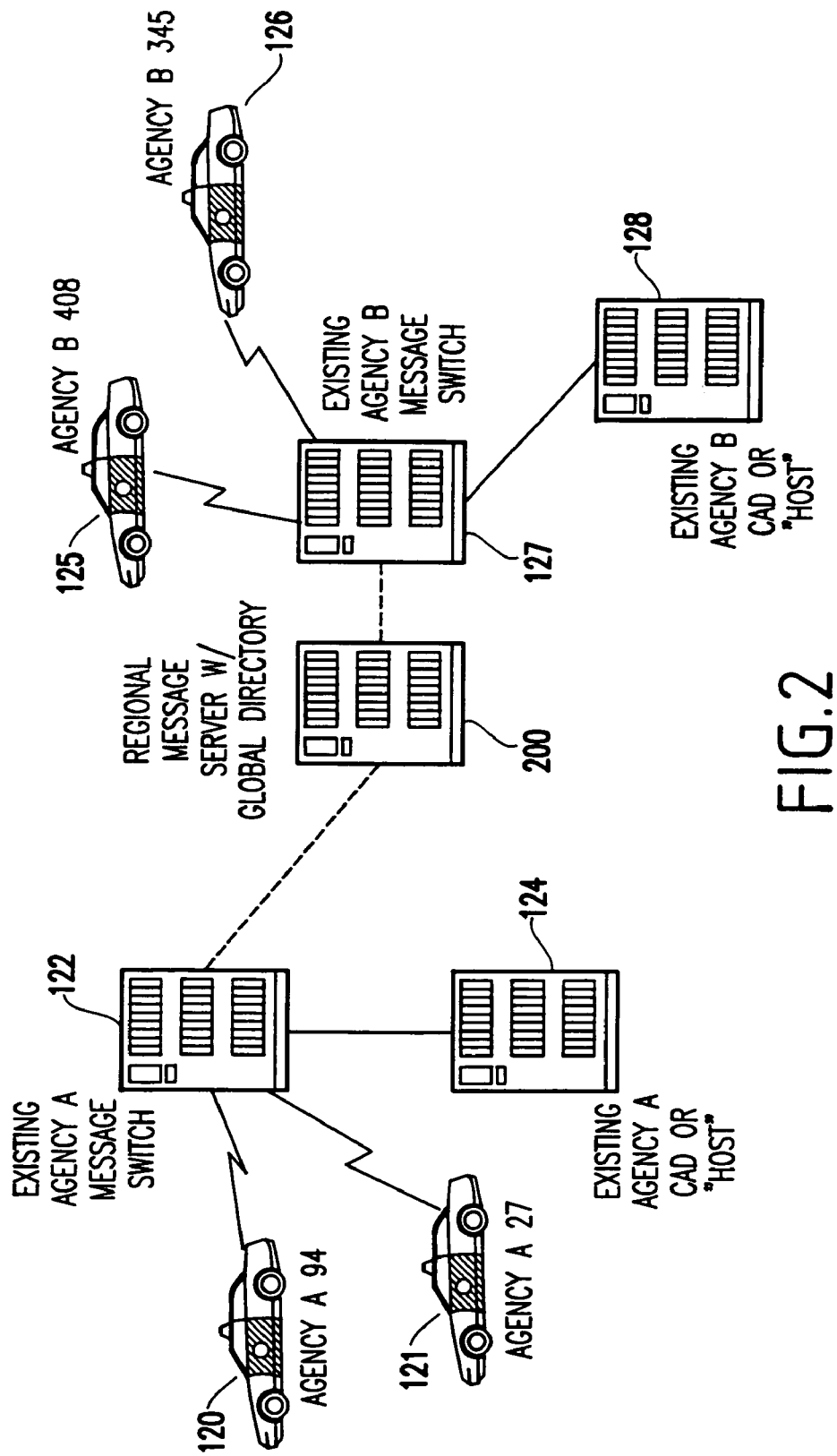
FIG. 2 is a schematic diagram of mobile communication systems interconnected according to the invention.

The inventive global directory, implemented on a "regional message server" 200, as shown in FIG. 2 below, provides a way for existing agencies to continue using their existing addressing schemes for local users, yet participate in the regional message server network. The inventive global directory may also be used by an officer in one agency to address a message to individuals in other agencies in situations requiring cooperation or assistance.

The regional message server 200 utilizes an addressing scheme based upon a hierarchical scheme. This permits each individual system's address scheme to remain intact, without modification. When messages are transmitted between different units 120, 121 within a given system, the messages are unaltered and operate according to that system's requirements. However, when messages are transmitted through the regional message server 200 to a unit in a different agency, additional information is added to the original message by the regional message server 200 that identifies the agency to which the message is directed.

Therefore, the invention does not alter messages that are originated and delivered within a given agency. Thus, the invention does not require modification of the existing architecture of any given agency. Instead, the invention provides an additional communication channel that allows messages to be transferred easily and quickly between agencies. The only additional information required to transmit a message to a different agency is the proper regional address to identify the unit in the different agency For example, Agency A's Unit 1121 wants to send a message to Unit M351 in Agency B. First, 1121 must have a global address for Unit M351. When Unit 1121 sends the message to Agency A's message switch, the message switch must have the logic to know it cannot deliver that message to a local device (due to the destination address being 'foreign' to Agency A) and it must put it on an outbound regional queue.

The regional message server will receive the message on its inbound queue and look up the local Agency B address and associated outbound queue in the Global directory. The regional message server will substitute this local address for the global address in the message 'To:' field prior to putting it on the outbound queue. Agency B's message switch will then get the message from its inbound queue. Agency B's message switch will recognize the address as a local address and simply deliver the message to Unit M351. Since the recipient of a message may want to respond to the sender, note that, in the example Unit M351 receives the Global address from the sender as the source address. This allows one to easily respond to the sender.

Figure 3:
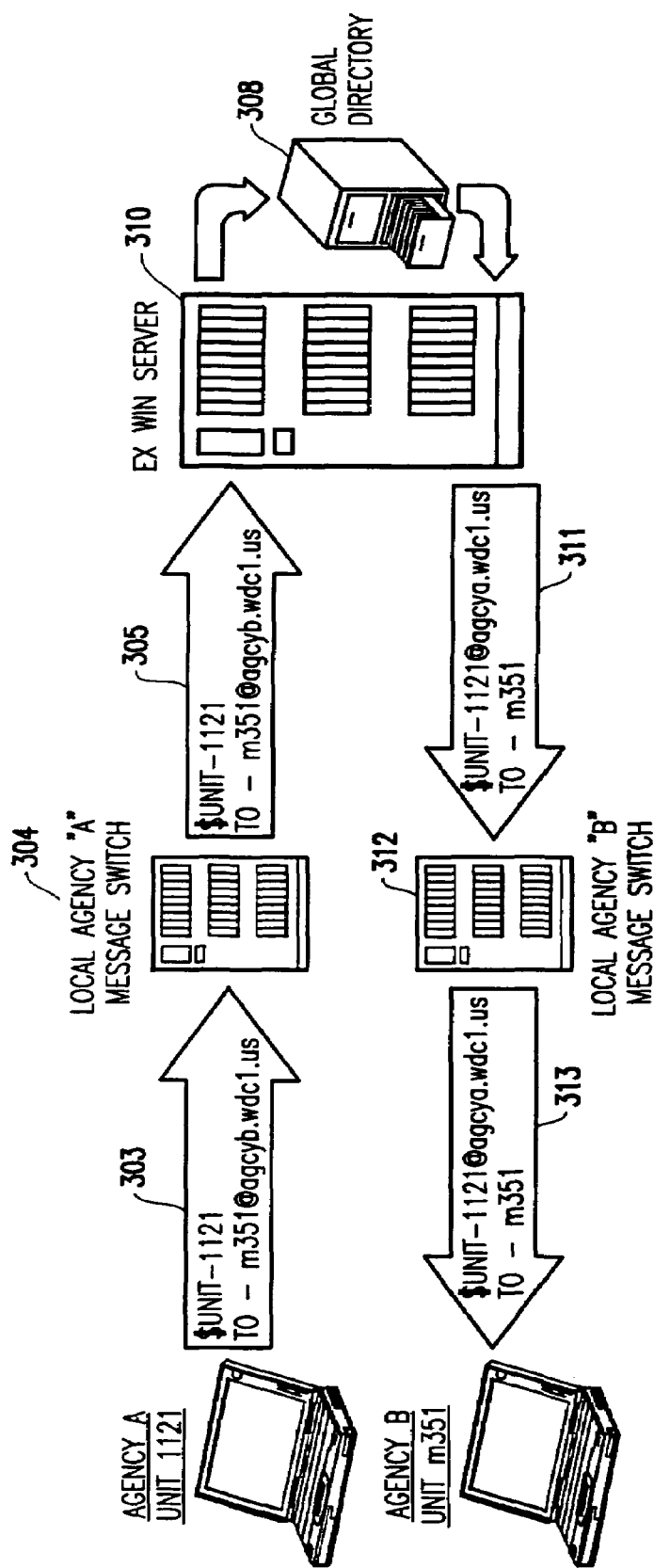
FIG. 3 is a flow diagram illustrating a preferred method of the invention.
Figure 4:
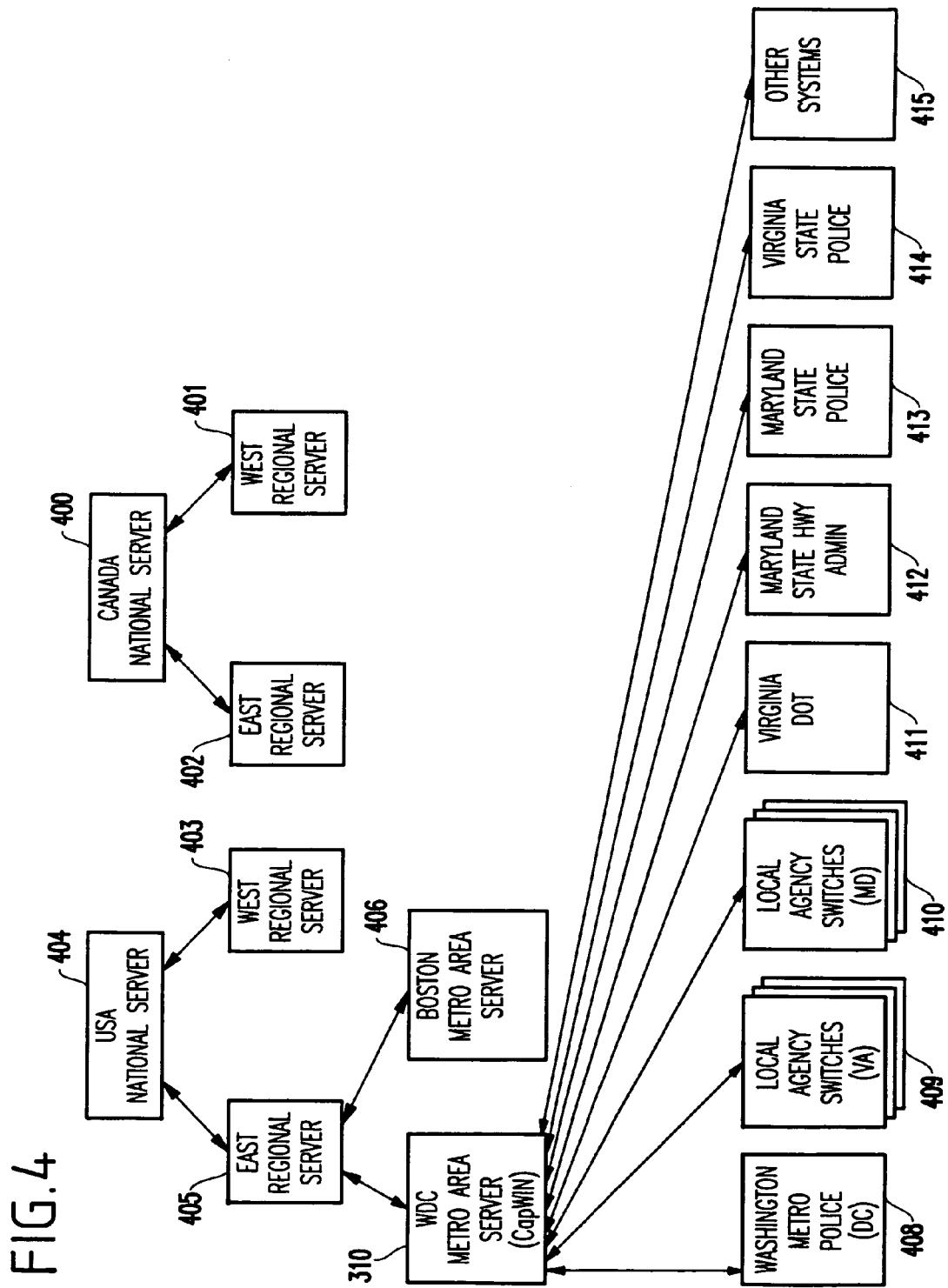
FIG. 4 is a schematic diagram of mobile communication systems interconnected according to the invention.

The example shown in FIGS. 3 and 4 illustrates one embodiment of the invention using a server 310 named "ExWIN" (Example Wireless Integrated Network), which allows inter-agency communication for all agencies within a given regional network (e.g., a tri-State area). Therefore, as shown in FIG. 4, the ExWIN server 310 allows the following message switches to communicate with one another: Municipal Police 408; other local agencies in State 1 409 and State 2 410; State 1 Department of Transportation (DOT) 411; State 2 State Highway Administration 412; State 2 State Police 413; State 1 State Police 414; as well as other systems 415.

As would be known by one ordinarily skilled in the art, the invention is not limited to a single system in the example tri-State area. Instead, the design is easily expandable to other cities, states, regions, countries, continents, etc. For example, the ExWIN (407) server 310 may need to communicate with other servers in other regions (e.g., Boston (BosWIN 406), east regional server 405, west regional server 406). Going even further, there may be a need to communicate with international servers (e.g., Canada and Mexico (CanWIN 400, also having east/west regional servers 401, 402). In other words, the addressing scheme of the ExWIN (407) system should be based upon a proven hierarchical scheme (e.g., Internet addressing, etc.) to enable scalability and global accessibility, although the invention is not limited to this particular addressing scheme.

Figure 5:
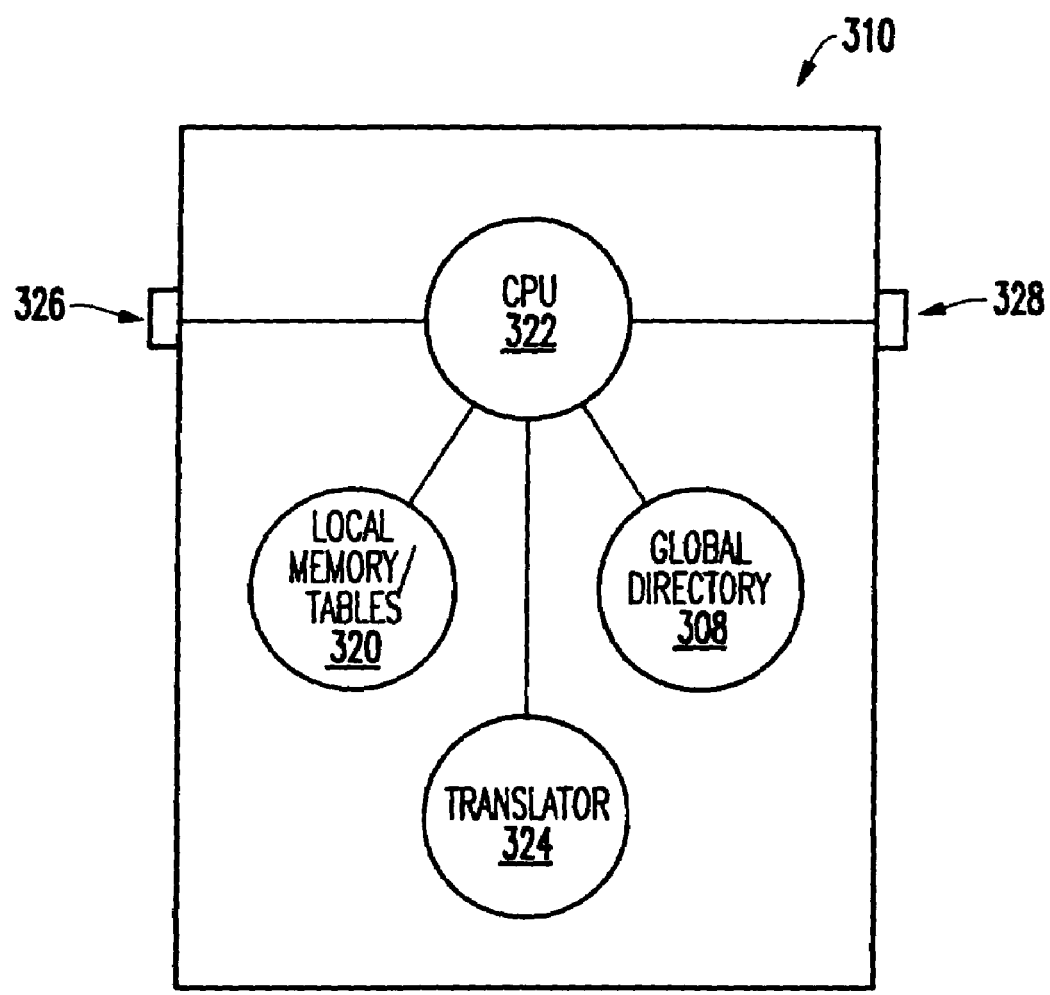
FIG. 5 is a schematic diagram of a regional server.

In this example, a global directory 308 is used by the ExWIN server 310 to provide a common addressing method that allows users 301 to send messages 303 to users 302 in other agencies or jurisdictions. FIG. 5 shows one rudimentary example of some elements that would be included in the regional message server (310). These elements include one or more connectors 326, 328 for connecting to the different message switching units 304, 312; a central processing unit (CPU) 322 for processing the messages (as discussed below); local memory/tables 320; a translator 324 for translating between the different languages/formats/protocols used by the different agencies; and the global directory 308.

The national and international servers 400–405 have a similar construction as shown in FIG. 5 (e.g., without the translators, etc.), but are connected to regional servers (e.g., 301) instead of switching units 304, 312. The global directory 308 of a regional server maintains addresses of units within each of the different agencies covered by that regional server. The national/international servers 400–405 have a directory that is different than global directory 308. All the national/international servers need is a directory of the regional servers so that they know to forward the message to a particular regional server. The invention is not limited to the schematic examples shown, but could be embodied in many different forms using many other similar/dissimilar components, as would be known by one ordinarily skilled in the art given this disclosure.

In the example shown in FIG. 3, unit 1121 (301) in agency A sends a message to unit M351 in Agency B. The message could include unit-to-unit, unit-to-host, host-to-unit, and host-to-group addresses. Initially, the message 303 has a sending identification ($UNIT) of "1211" and a destination identification of "m351@agencyb.metro1.us" in which "m351" identifies the recipient unit, "Agency B" identifies the destination Agency B, "metro 1" identifies the Metropolitan ExWIN server 310, and "us" represents the recipient country "United States." The Agency A message switch 304 forwards the message 305 to the server that is in the "us" (the United States) national system and corresponds to "metro 1" (e.g., the ExWIN server 310). The ExWIN server 310 uses the global directory 308 to convert the message address 311 to an address acceptable to Local Agency "B" Message Switch 312, and to show that the sender is "1121@agencya.metro1.us," which allows the recipient to know which agency and unit sent the message. The message 311 is then forwarded to the Agency B server 312, which forwards the message to the appropriate unit "M351" 302.

As shown in FIG. 3, the two agencies presently have an existing mobile data system in place. These systems were designed to allow officers within each respective agency to send and receive messages among local agency units and the local host (CAD) system. As mentioned above, each agency chooses the method by which they want to address their units. Agency address plans typically reflect their method of operation. Some agencies use officer badge numbers, some use unit numbers assigned to vehicles, some may use beat plan representations, and others may simply choose arbitrary numbers. The problem is that each particular agency has its own schema and formats for addressing mobile and stationary units. When each agency exists on its own, with no inter-agency integration requirement, it really doesn't matter how they choose to address their units. It is also quite likely that, in a case such as ExWIN, some agencies would, in fact, choose similar schemes so that one agency (e.g., State 1 Police (414)) may have addresses that are duplicated in another agency (e.g., State 2 Police (413)). Clearly, this is a problem that must be solved if inter-agency communication is to be achieved.

The global directory 308 provides a way for existing agencies to continue using their existing addressing schemes for local users, yet participate in the ExWIN (407) network. Another point of concern is coordination. The global directory 308 allows one unit in one agency to look up an address of another unit in another agency. The global directory contains a table of all local unit addresses from each agency participating in the regional data communications system, with the corresponding global unit addresses.

The following tables provide examples of the global directories that each regional message server would include. The example below shows unique domain names for possible ExWIN-type servers (e.g., East Regional (405) and West Regional (403)).

| ExWIN-type Server | Server ID |
|---|---|
| USA National Server 1 | National1.us |
| USA National Server 2 | National2.us |
| Canada Server | National1.ca |
| USA East Region Server 1 | Eastreg1.us |
| USA West Region Server 1 | Westreg1.us |
| USA Metro Server 1 (ExWIN) | ExWIN.us |
| USA Boston metro Server 1 | Boston1.us |

Using the hierarchical capability of the addressing scheme, assume that one city (e.g., Boston) has a mobile data system message switch and they want to tie into another city (e.g., Washington D.C.) the Boston message switch would be known globally as "boston1.Eastreg1.us". The table below provides more examples of how local message switches could be addressed from external agencies.

| Local Message Switch | Global Address (ExWIN System ID) |
|---|---|
| Metropolitan PD 1 | Metro1pd.exwin.us |
| State 1 Police | State1Police.exwin.us |
| State 1 Department of Transportation | State1DOT.exwin.us |
| Metropolitan PD 2 | Metro2pd.exwin.us |
| Agency A | Agcya.exwin.us |
| Agency B | Agcyb.exwin.us |

Considering the local user id's which are unique within each agency, the following table shows how these users would be addressed by other ExWIN users.

| Local User ID | Agency | Global Address (ExWIN User ID) |
|---|---|---|
| MDC101 | Metropolitan PD 1 | Mdc101@Metro1pd.exwin.us |
| CAR121 | Metropolitan PD 2 | Car121@metro2pd.exwin.us |
| M4552 | State 1 Police | M4552@State1Police.exwin.us |
| 1121 | Agency A | 1121@agcya.exwin.us |
| M351 | Agency B | M351@agcyb.exwin.us |

Although not an explicit requirement, it is possible that some users may be assigned directly to the ExWIN (407) server instead of a local agency message switch (e.g., State 1 (409) and State 2 (410)). If this is the case, the inventive regional server supports direct users well by allowing unique user id's at the ExWIN level, as shown in the following table.

| Users defined in "exwin.us" server | Global Address (ExWIN User ID) |
|---|---|
| John Doe | Jdoe@exwin.us |
| Michael Fox | Mfox@exwin.us |

The global directory resides in the regional message server 200 and reconciles local agency addresses with global ExWIN User ID's. Note that the requirement to support existing mobile data systems will influence much of the design of the Global directory and the associated addressing plan. For example, some existing systems may have restrictive character lengths for unit-to-unit messaging (e.g., State 2 State Hwy. Admin. (412) and State 1 DOT (411)) which could influence the naming conventions used in the address scheme shown.

The various systems that will be integrated with the inventive system will likely use different formats and descriptors in their messages. The regional server will use a conventional rules engine and formatter to convert and resolve these disparate formats into recognizable formats for the target systems. However, looking at the example shown above, a message that comes from a local agency message switch destined for another agency system shown in FIG. 3, the following is an explanation of the conventions used therein.

| Label | Contents |
|---|---|
| $UNIT | Unit Logical Identifier of the message originator |
| TO | (Required) Message Addressees |
| SUBJECT | (Required) The subject field for the message |
| TEXT | (Required) Message text |

When Agency A's Unit 1121 (301) wants to send a message to Unit M351 in Agency B (302), first, unit 1121 must have a global address for Unit M351 (which can be obtained from the global directory 308). When the local message switch for Agency A receives this address, because it has logic to determine that it is undeliverable in the local agency, it will forward it to the ExWIN (310) server for delivery. Note that message switch A must have the logic to know that it cannot deliver that message to a local device (due to the destination address being 'foreign' to Agency A) and that it must put it on an outbound regional queue.

The following table within the global directory that provides entries to describe the mapping of local agency ID's to global ExWIN addresses.

| ExWIN Global Directory | | | |
|---|---|---|---|
| Agency | Local ID | ExWIN User ID | Outbound Q |
| Agency B | 1121 | 1121@agcyb.exwin.us | Queue_B |
| Agency B | M351 | M351@agcyb.exwin.us | Queue_B |
| Agency A | 1121 | 1121@agcya.exwin.us | Queue_A |
| Local ID | | Unique within local agency | |
| ExWIN User ID | | Unique global address | |
| Outbound Q | | Queue associated with the destination message switch. Queue to which outbound messages shall be 'put'. | |

When Unit 1121 (301) sends the message 303 to Agency A's message switch 304, the message switch has the logic to know that it cannot deliver that message to a local device (due to the destination address being 'foreign') and that it must 'put' it on the outbound ExWIN Queue 305. The invention will identify typographical errors in local addresses as "foreign", in which case the regional message switch will ID it as undeliverable and send it back to the sending agency. The address used by Unit 1121 to address Unit M351 in Agency B will be the ExWIN Global address for Unit M351 (m351@agcyb.exwin.us).

The ExWIN server 310 gets the message 303 from its inbound queue 305 and looks up the local address and associated outbound queue in the global directory 308. The ExWIN server 310 then substitutes this local address for the global address in the message 'To:" field prior to putting it on the outbound queue 311. Agency B's message switch 312 will then get the message from its inbound queue 311. Agency B's message switch 312 will recognize the address as a local address and simply deliver the message to Unit M351 (302). The recipient of the message may then want to respond to the sender. Note that in the example, Unit M351 receives the global address from the sender as the source address. This allows the recipient to easily respond to the sender.

There are several alternative methods to populate and maintain the directory. Some options are outlined here. However, as would be known by one ordinarily skilled in the art, there are other methods. One method uses a browser and constructs a web-based application that is accessed by local agency administrators. Agency administrators are allowed access only to their local user information on the ExWIN (407) server. The administrators can add/delete/update user information within the global directory. Another method uses automated updates. With automatic updates, if local switch vendors provide the facility, it is possible to generate a list of local user identification, which, combined with the local agency ID, could be used to automatically construct the local and ExWIN identifications in the global directory. The regional message server 200 could use XML documents to support this capability.

Groups and assignments are also supported by the global directory. There are many options for this capability. Two examples, shown below, place users into groups based upon particular task assignments or simply as part of a region assignment. The following are examples of what can be accomplished with the global directory and hierarchical addressing, and are not limiting. For example, consider the following as part of the global directory.

| Group | Assigned User ID's |
|---|---|
| Metro1drug@exwin.us (Global Assignment-Metro1 drug task force members could be assigned to this group). | 1342@metro1.exwin.us 1244@metro2.exwin.us 2453@metro3.exwin.us . . |
| antiterror@exwin.us (Global Assignment-All users in ExWIN area assigned to Terrorist Response Unit could be under this group) | M423@agcy1.exwin.us C423@agcy2.exwin.us . . |
| HAZMAT Unit Airport Unit Traffic Units | |

The above table shows how the invention allows users to be assigned to a special force or task. This allows an administrator to rapidly coordinate officers in response to emergencies. For example, by simply sending one message to antierror@exwin.us, the ExWIN server 301 automatically sends the message to all users assigned to this group. Note that, by using the power of hierarchical addressing in the task assignment groups, several levels of groups can be created.

The invention also provides the ability to group users according to general assignment (geographic) areas. These are called 'Regions' of assignment (similar to beat plans). The following table provides an example of how this is accomplished. The following table is identical to the generic group table above, but is restricted only to designated ExWIN 'Regions'. Another difference is that, with the generic group above, only system administrators with the proper authority can add/delete users from the groups. The Region group users, however, will likely need to be modifiable by the officers themselves while on duty. The reason for this is the dynamic nature of where officers are working on a given shift.

| Group | Assigned User ID's |
|---|---|
| Centralregion@exwin.us (Global Assignment-All users in ExWIN area patrolling or assigned to the 'Region' known as "Central" could assign themselves to this group). | 1352@metro1.exwin.us<br>1244@metro2.exwin.us<br>2453@metro3.exwin.us |
| HWY1s_region@exwin.us (Global Assignment-All users in ExWIN area patrolling or assigned to the 'Region' designated as Highway 1 South could assign themselves to this group). | M423@agcy1.exwin.us<br>C423@agcy2.exwin.us<br>MDC42@agcy3.exwin.us |
| . | . |
| . | . |
| . | . |
| Airport_region@exwin.us (Global Assignment-All users in ExWIN area patrolling or assigned to the Airport region could assign themselves to this group). | . |

The idea behind these groupings is that a message can be addressed to a 'Region' which allows the regional message server to forward the message to all users within that particular Region. For example, a message addressed to Airport_region@exwin.us is sent to all logged-on users working in that Region. The ExWIN Server uses the associated Global ID's to find the Local ID's and destination queues and then sends the messages to the appropriate recipients.

If a dynamic assignment is required for updating regions, updates may be made by officers using the simple text messaging facility provided by most (if not all) mobile system vendors. For example, suppose Agency A's Unit 1121 (301) wants to add itself to the "Pkwy" Region because he will be patrolling that area during his shift, he can send a text message such as: To: pkwy_region@exwin.us, Subject: Assign Region, Message: . . . This provides a simple message that the local message switch will forward to ExWIN (since the message does not contain a local address). The ExWIN Server 310 will recognize this as an administrative message and update the global directory table 308. The invention is not limited to the foregoing format or syntax. The foregoing example simply shows that the invention provides a mechanism of grouping, and that updating the groups is accomplished without requiring new software for existing agencies. Any interface can be used to support this type of activity, but in order to support the myriad of devices now deployed, a text messaging interface provides a convenient facility to enable this capability on existing systems.

The global directory 308 also tracks whether a user is logged on. This feature provides a way to reduce traffic to users not logged on, and provides a reasonable method to reset the region table when the user logs off. One procedure to track whether a user is logged on is described as follows. First, when the user 301 logs on, the local switch 304 sends a message to regional server 310 that the unit 301 is logged on. The server 310 sets a flag in a table to denote that user 301 (1121@agcya.exwin.us) is logged on. When the user 301 logs off, the local switch 304 sends a message to the regional server 310 that user 301 is logged off. The regional server 310 then sets a flag in the table to denote that user 301 (1121@agcya.exwin.us) is logged off. As would be known by one ordinarily skilled in the art, the invention is not limited only to this procedure.

As mentioned above, the invention allows users to look up global addresses of intended message recipients by accessing the global directory 308. There are several ways this can be done, and the best way will depend upon exactly how the invention is to be used. One method is related to the example of groups described above. Typically, a scenario might involve officers from different agencies converging on a scene or working in a particular area. Using the 'Region' example above, an officer could use the messaging facility again to interact with the global directory 308 to determine the Global ID of officers working in the same Region. For example, consider the following query to find out who might be working the "airport" area: To: airport_region@exwin.us, Subject: Query Region, Message: . . . As shown, the invention uses the existing messaging facility to enable new functions such as inquiring against the Global directory. In this case, the user would expect to get a message from the ExWIN Server 310 that looks similar to:

| Agency | Global ID |
|---|---|
| Metro 1 PD | 9430@metro1.exwin.us |
| State 2 DOT | M423@state2dot.exwin.us |
| Agency X | 2167@agcyx.exwin.us |

This would tell the officer that other units (e.g., Metro 1 PD (414) and State 2 DOT (411)) were working the area and give him their ID's. Once these users log off and new users log on, running this inquiry again would have different results. A user could also inquire on the general Groups such as: To: metro1drug@exwin.us, Subject: Query Group, Message:. This inquiry would return the ID's of users working in the Metropolitan Drug Task force. Using the Global directory, all local units and hosts that are capable of messaging can participate in the ExWIN regional data communications system by having an associated global address. This enables the required unit and host messaging throughout the ExWIN (407) network.

The invention allows users in one agency to specifically address users in other agencies with minimal impact to users of existing mobile data systems. The invention offers an environment that is easily scalable as new agencies decide to participate. The invention is based upon a regional message server using a global directory. In addition to supporting regional users, the inventive addressing plan used to support the global directory also supports expansion into other regions, states, and even nations. In addition to the benefit of providing basic messaging capabilities (e.g., unit-to-unit, unit-to-host, host-to-unit, etc.), the invention enables efficient implementation of several more advanced functions (e.g., dynamic group addressing). The invention can also be used to solve problems in integrating dissimilar legacy systems in applications other than in public sector/public safety.

The invention permits a determination of who is currently logged on and available to communicate and potentially participate in incident response. The invention can be applied to any similar environment where communications between multiple, incompatible data communication systems is required or desirable. For example, if package delivery firm A, that operates data communication system A, acquires package delivery firm B, the invention will enable firm A to utilize firm B's existing data communication system with minimum impact and cost. The resulting interoperable environment would be very similar to the public safety examples already provided.

While the invention has been described in terms of preferred embodiments, those skilled in the art will recognize that the invention can be practiced with modification within the spirit and scope of the appended claims.

What is claimed is:

1. A regional message server of a communication system, said regional message server comprising:
   a first connection for connecting to a first agency, wherein said first agency communicates under a first addressing scheme;
   a second connection for connecting to a second agency, wherein said second agency communicates under a second addressing scheme;
   a global directory connected to said first connection and said second connection, wherein said global directory is adapted to provide a common hierarchical addressing scheme for said first agency and said second agency and to maintain both global addresses and local addresses for said first agency and said second agency, and wherein said common hierarchical addressing scheme provides said global addresses by adding to said local addresses additional information that identifies one of said first agency and said second agency; and
   a central processing unit connected to said first connection and said second connection and said global directory, wherein said central processing unit is adapted to receive from said first agency a message having a global address for said second agency, to substitute a local address corresponding to said global address, and to transmit said message to said local address in said second agency.

2. The regional message server in claim 1, wherein said first connection connects to a first message switching unit in said first agency and said second connection connects to a second message switching unit in said second agency.

3. The regional message server in claim 1, further comprising a translator, wherein said first agency and said second agency operate under different addressing protocols and said translator translates between said different addressing protocols.

4. The regional message saver in claim 1, wherein said global directory further maintains said local addresses and said corresponding global addresses of units within said first agency and said second agency.

5. The regional message server in claim 1, wherein said central processing unit changes a global address of a unit in said second agency in a message received from said first agency into a format, such as a local address, acceptable to said second agency and forwards said message to said second agency.

6. The regional message server in claim 1, wherein said first agency and said second agency are provided access to said global directory to obtain said global addresses of units within said global directory.

7. The regional message server in claim 1, wherein said central processing unit produces a report of active units in said first agency and said second agency.

8. A communication system comprising:
   a plurality of first-level regional servers, each connected to a first agency and a second agency; and
   a second-level regional server connected to a said plurality of said first-level regional servers, wherein each of said first-level regional servers comprises:
   a first connection for connecting to said first agency, wherein said first agency communicates under a first addressing scheme;
   a second connection for connecting to said second agency, wherein said second agency communicates under a second addressing scheme;
   a global directory connected to said first connection and said second connection, wherein said global directory is adapted to provide a common hierarchical addressing scheme for said first agency and said second agency and to maintain both global addresses and local addresses for said first agency and said second agency, and wherein said common hierarchical addressing scheme provides said global addresses by adding to said local addresses additional information that identifies one of said first agency and said second agency; and
   a central processing unit connected to said first connection and said second connection and said global directory. wherein said central processing unit is adapted to receive from said first agency a message having a global address for said second agency, to substitute a local address corresponding to said global address, and to transmit said message to said local address in said second agency.

9. The communication system in claim 8, wherein said second-level regional server comprises:
   a first connection for connecting to one first-level regional server;
   a second connection for connecting, to another first-level regional server;
   a directory of regional servers; and
   a central processing unit.

10. The communication system in claim 9, wherein said directory of regional sewers maintains addresses of all regional servers serviced by said communication system.

11. The communication system in claim 9, wherein said central processing unit forwards said message from one first-level regional server to one or more second-level regional servers.

12. A method of transferring messages between a first agency and a second agency, said method comprising:
   using a common hierarchical addressing scheme to provide corresponding global addresses for local addresses in said first agency and said second agency by adding to said local addresses additional information that identifies one of said first agency and said second agency;

transferring a message having one of a local address for said first agency and a global address for said second agency from a sending unit in said first agency to a first message switching unit within said first agency, wherein said first agency communicates under a first addressing scheme;

transferring said message from said first message switching unit to a regional message server if said message has said global address for said second agency;

substituting, by said regional message server, said local address corresponding to said global address for said second agency;

transferring said message from said regional message server to a second message switching unit in said second agency, wherein said second agency communicates under a second addressing scheme; and transferring said message from said second message switching unit to a destination unit in said second agency.

13. The method in claim 12, further comprising translating, by said regional message server, said message from an addressing protocol used by said first agency to a protocol used by said second agency.

14. The method in claim 12, further comprising maintaining a global directory having said local addresses find said global addresses of units within said first agency and said second agency.

15. The method in claim 14, further comprising providing said first agency and said second agency access to said global directory to obtain said global addresses of said units within said global directory.

16. The method in claim 12, further comprising producing a report of active units in said first agency and said second agency.

17. A method of transferring messages between a first agency and a second agency, said method comprising:

establishing a network in which said first agency and said second agency are each in communication with a corresponding one of a plurality of first-level regional message servers and in which each of said plurality of first-level regional message servers are in communication with a second-level regional message server;

using a common hierarchical addressing scheme to provide corresponding global addresses for local addresses in said first agency and said second agency by adding to said local addresses additional information that identifies one of said first agency and said second agency and said corresponding one of said first-level regional message servers:

transferring a message from a sending unit in a first agency to a first message switching unit within said first agency, wherein said first agency communicates under a first addressing scheme;

transferring said message from said first message switching unit to said corresponding first-level regional message server of said first agency, if said message has a global address that identifies said second agency and said corresponding first-level regional message server;

transferring said message from said first-level regional message server of said first agency to a second-level regional message server;

transferring said message from said second-level regional message server to said first-level regional message server of said second agency;

substituting, by said first-level regional message server of said second agency said local address corresponding to said global address;

transferring said message from said first-level regional message server of said second agency to a second message switching unit in said second agency, wherein said second agency communicates under a second addressing scheme; and transferring said message from said second message switching unit to a destination unit in said second agency.

18. The method in claim 17, further comprising translating, by one of said first regional message server and said second regional message server, said message from an addressing protocol used by said first agency to a protocol used by said second agency.

19. The method in claim 17, further comprising maintaining a global directory having said local addresses and said global addresses of units within said first agency and said second agency.

20. The method in claim 19, further comprising providing said first agency and said second agency access to said global directory to obtain said global addresses of units within said global directory.

21. The method in claim 17, further comprising producing a report of active units in said first agency and said second agency.

* * * * *